United States Patent [19]

Mackenzie et al.

[11] Patent Number: 4,595,083
[45] Date of Patent: Jun. 17, 1986

[54] BRAKE ACTUATOR DEVICE HAVING A HYDRAULIC SLACK-ADJUSTING ARRANGEMENT

[75] Inventors: Robert Mackenzie, Toronto; Thomas Digweed, Beamsville, both of Canada

[73] Assignee: WABCO Ltd., Hamilton, Canada

[21] Appl. No.: 672,962

[22] Filed: Nov. 19, 1984

[51] Int. Cl.⁴ .................. F16D 65/56; F16D 65/74
[52] U.S. Cl. .................. 188/196 C; 188/170; 188/196 A; 188/196 D; 188/351; 192/111 A
[58] Field of Search .......... 188/196 A, 196 C, 196 D, 188/170, 71.8, 71.9, 351; 192/111 A

[56] References Cited

U.S. PATENT DOCUMENTS

| | | | |
|---|---|---|---|
| 2,385,625 | 9/1945 | Hopmans | 188/196 A X |
| 2,952,338 | 9/1960 | Oswalt | 188/351 |
| 3,118,520 | 1/1964 | Jernstrom | 188/196 A X |
| 3,441,111 | 4/1969 | Spalding | 188/170 |
| 3,647,030 | 3/1972 | Burnett | 188/196 D X |
| 3,661,230 | 5/1972 | Burnett | 188/196 D X |
| 4,267,903 | 5/1981 | Kita et al. | 192/111 A X |

FOREIGN PATENT DOCUMENTS 648027 7/1937 Fed. Rep. of Germany ... 188/196 A

*Primary Examiner*—George E. A. Halvosa
*Attorney, Agent, or Firm*—G. E. Hawranko

[57] ABSTRACT

A disk brake actuator having a hydraulic slack-adjusting arrangement for maintaining a positive clearance between a brake shoe and a brake disk, includes a cylinder housing having disposed therein a brake-applying spring section, a hydraulic-operated release section, and an actuator piston spindle arrangement operably-connected to the spring section by way of a clutch arrangement. A flange, formed on the actuator piston, acts as a plunger during a brake application and draws a first amount of hydraulic fluid into a first storage area, such first amount corresponding in volumn to the clearance between the brake disk and brake shoe when a nonworn brake shoe is first used. Upon release of the brake, the actuator piston forces the hydraulic fluid back into a second storage area wherein is included a shuttle member movable with a shuttle chamber. Additional hydraulic fluid is drawn from a reservoir when actuator piston movement, beyond the original clearance value, occurs as a result of brake shoe wear. The additional hydraulic fluid corresponds in volumn to that amount of brake shoe wear and remains in the first storage area upon brake release, thus maintaining the actuator piston at the original clearance distance relative to the brake shoe and brake disk. The additional volumn of hydraulic fluid is prevented from returning to the reservoir by a check valve. A bleed screw in the reservoir allows bypassing the check valve when new brake shoes are installed and the additional hydraulic fluid must be returned.

16 Claims, 2 Drawing Figures

BRAKE ACTUATOR DEVICE HAVING A HYDRAULIC SLACK-ADJUSTING ARRANGEMENT

BACKGROUND OF THE INVENTION

This invention relates to a hydraulic slack-adjusting arrangement for use in conjunction with spring-applied, hydraulic-released disk brake actuators for use on railway vehicles. Such a hydraulic slack-adjusting arrangement must ensure that a positive and precisely-controlled clearance exists between the brake shoe and the disk when the brake is released following a brake application. A positive clearance is necessary to prevent the brake shoe from creating a drag on the disk during release, a condition which can occur with use of a zero clearance-type slack adjuster. Such drag characteristics inherently require higher expenditures of locomotive power which, due to today's high cost of fuel, puts the zero clearance slack adjuster at a critical disadvantage. In turning to the positive clearance slack adjusters, however, the use of the relative contact positions between the brake shoe and the disk to set a slack-adjusting limit, is not available as it is with a zero clearance-type slack adjuster. As a consequence, to return to the positive clearance as existed before a brake application, slack adjusters to date have typically employed complicated mechanical arrangements such as a ratchet-pawl arrangement, a worm gear-worm shaft or a spindle-screw type arrangement. Each of the above-mentioned arrangements has the disadvantage of being adjustable only to the larger increments dictated by the interrelationship of the mechanical components. In addition, this interrelationship between the mechanical components, as for example, a nut threadedly engaged to a spindle element, will result in some wear of the respective components and has also been known to result in binding between the components.

Still other positive clearance slack adjusters have added hydraulic features to overcome problems associated with purely mechanical arrangements. Such arrangements have typically required complex coupling and measuring components which, by being external to the brake actuating device, have increased the overall size of the device and have resulted in higher installation and maintenance costs.

SUMMARY OF THE INVENTION

The object of this invention, therefore, is to provide a hydraulic slack adjuster for use with spring-applied disk brake actuators, wherein a positive and precisely-controlled clearance is maintained to a small incremental degree in response to brake shoe wear, as can occur during brake application.

It is a further object of the invention to provide this precisely-controlled positive clearance slack adjuster using a minimum number of components, all contained within the brake actuator housing, thereby facilitating manufacture and reducing installation and maintenance costs.

It is yet another object of this invention to utilize a hydraulic-type slack-adjusting arrangement, fully contained within the brake-actuating device. Such an arrangement achieves the positive and precisely-controlled clearance without relying on mechanically-coupled components which can result in wear and binding problems.

Briefly, the invention consists of a housing portion which is formed as an extension of the disk brake actuator housing. A shuttle chamber formed in this housing extension is connected via a first passageway to the piston chamber of the brake actuator. A shuttle member disposed within the shuttle chamber is moved from a left-hand stop to a right-hand stop during a brake application whereby hydraulic fluid is drawn into the piston chamber from the shuttle chamber and a network of passageways in the housing extension. The volume of hydraulic fluid drawn into the piston chamber at this time substantially corresponds to a full brake application using a brake shoe which has no signs of wear. As the brake shoe wears and further piston displacement occurs, additional hydraulic fluid is drawn from a fluid reservoir into the piston chamber through a check valve and the passageway network. This additional hydraulic fluid corresponds to the additional movement of the piston beyond the initial positive clearance as results from the brake shoe wear. When the brake is then released, the hydraulic fluid present in the piston chamber is forced back into the passageway network and the shuttle chamber by the retraction of the piston member. The hydraulic fluid which was drawn from the reservoir portion and which corresponds to the brake shoe wear, remains in the piston chamber, thereby allowing the piston member to only retract the distance as corresponded to the brake shoe, brake disk clearance as existed before the brake application. A bleed screw allows bypass of the check valve, thereby allowing the hydraulic fluid to return to the reservoir portion from the piston chamber, such provision allowing replacement of a worn brake shoe with a new brake shoe.

DESCRIPTION AND OPERATION

Figure 1:
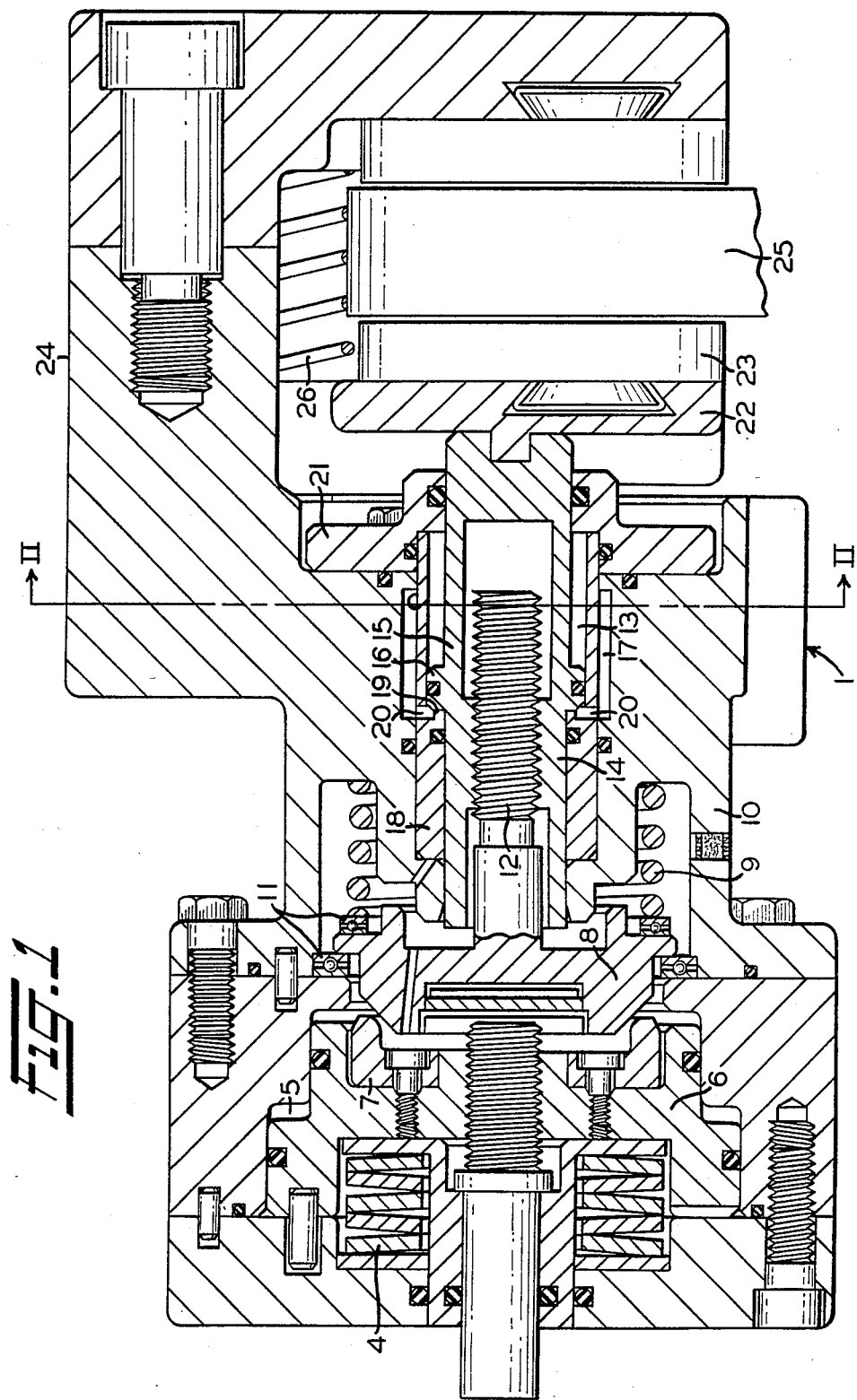
FIG. 1 is an elevational view, in section, of a spring-applied, hydraulic-released disk brake actuator.
Figure 2:
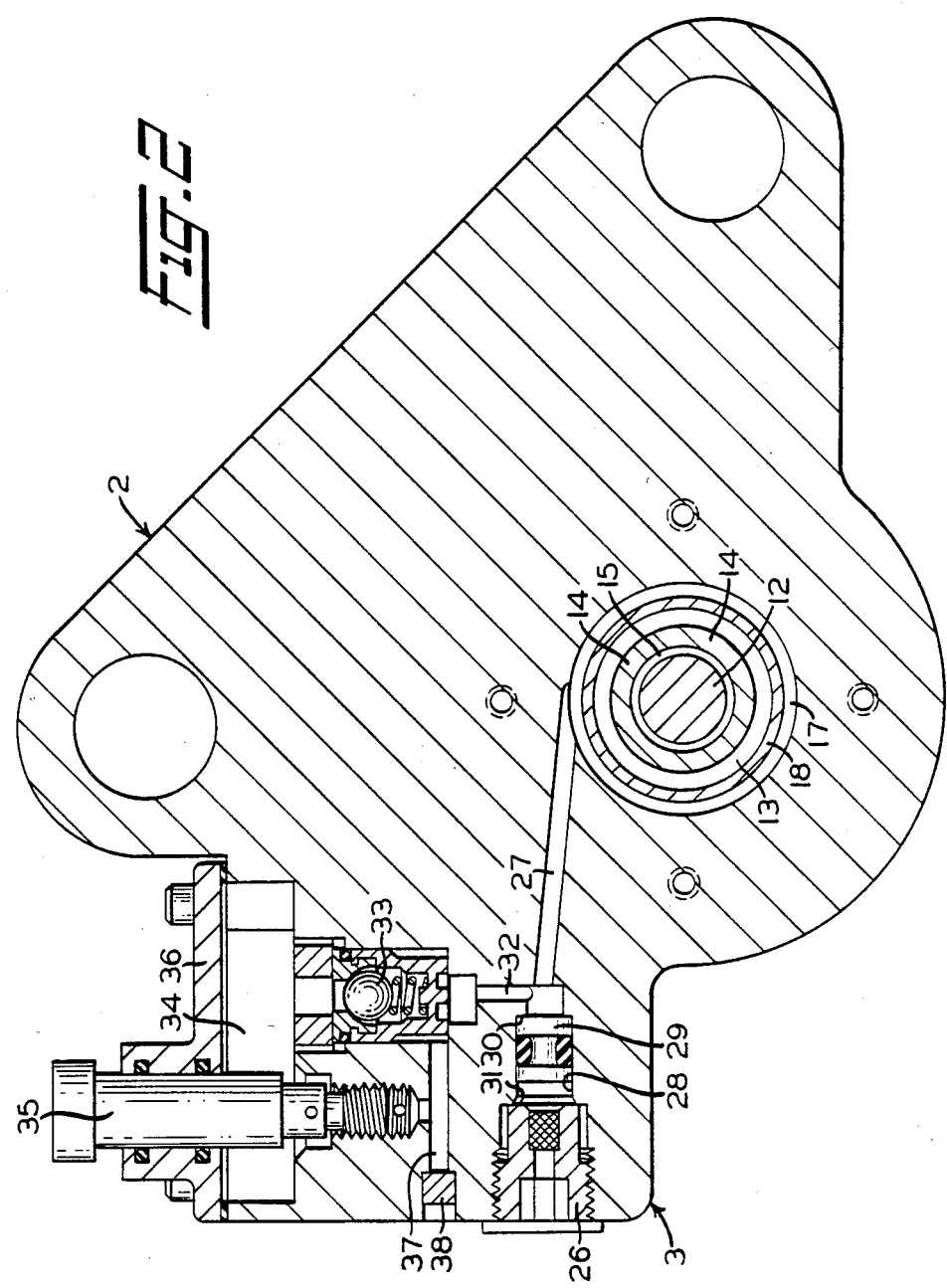
FIG. 2 is an elevational view, in section, of a hydraulic slack adjuster rotated 45° about lines II—II of FIG. 1.

As seen in FIG. 1, the disk brake actuator 1, which utilizes the hydraulic slack adjuster embodying the invention, consists of an actuator housing 2 with a housing extension 3, better shown in FIG. 2, extending therefrom. The braking force for the disk brake actuator 1 is provided by disk springs 4. Disposed within a hydraulic piston chamber 5 of the actuator housing 2 and adjacent the disk springs 4 is a hydraulic piston 6. A clutch arrangement consisting of a clutch seat 7 and a cone clutch 8 is disposed adjacent the hydraulic piston 6. The clutch seat 7 is secured to the hydraulic piston 5 for coincident movement therewith. A first coil spring 9, disposed within a spring housing portion 10 adjacent the hydraulic piston chamber 5, biases the cone clutch 8 toward the clutch seat 7 for a more positive clutch engagement. A pair of thrust bearings 11 cooperate with the cone clutch 8 to allow smooth rotational movement of the cone clutch 8 about a threaded spindle 12 on which the cone clutch 8 rotates. The threaded spindle 12 extends into a portion of the piston chamber 13 located adjacent the spring housing portion 10. Disposed within the actuator chamber 13 is an actuator piston 14 having a hollow core portion 15 formed therein to allow insertion of a portion of the spindle member 12. Formed along a portion of the outer circumference of the actuator piston 14 is an annular flange portion 16 which slidably moves within the piston chamber 13. Formed around a portion of the piston chamber 13 and separated from the piston chamber 13 is an annular chamber 17. A graduated sleeve member 18 can be disposed between the piston chamber 13 and the annular chamber 17 as the means for separating the respective chamber 13, 17. A sleeve shoulder 19 formed on the inner portion of the graduated sleeve 18 acts as a stop for the actuator piston 14 when the flange portion 16 contacts the sleeve shoulder 19. The annular chamber 17 is, at times in communication with the piston chamber 13 via at least one chamber opening 20 formed in the graduated sleeve 18 at like ends of the respective chambers 13, 17. A piston chamber end cap 21 is secured at the end of the piston chamber 13 to maintain the integrity of the piston chamber 13 as the actuator piston 14 reciprocally moves therethrough. A brake head 22 secured to the actuator piston 14, and a brake shoe 23 secured to the brake head 22, reside in a disk housing portion 24 of the actuator housing 2. A disk member 25, also residing in this disk housing portion 24, either rotates during brake disengagement or is restrained from rotating during a brake application. A return spring 26 is disposed in the disk housing portion 24 for urging the brake shoe 23, brake head 22, and actuator piston 14 to the brake-disengaged position.

As further seen in FIG. 1, a first passageway 27 branches off from the piston chamber 13 at a point just prior to the piston chamber end cap 21. Referring to FIG. 2, it can better be seen that this first passageway 27 slopes slightly upward from the piston chamber 13 to a shuttle chamber 28 formed in the housing extension 3. A shuttle member 29, disposed within the shuttle chamber 28, is movable between a right-hand stop 30 and a left-hand stop 31 and vice-versa upon the flow of hydraulic fluid to and from the shuttle chamber 28. The amount of hydraulic fluid required to affect this shuttle member 29 displacement is directly proportional to a full stroke of the actuator piston 14 during a brake application, wherein a brake shoe 23 having no signs of wear is used. Upon continued brake applications, brake shoe 23 wear will occur thus requiring the actuator piston 14 move further to the right drawing additional hydraulic fluid into the piston chamber 13. A second passageway 32 formed in the housing extension 3 extends upward between one end of the first passageway 27 and one end of the shuttle chamber 28. Hydraulic fluid, originally present in the first and second passageways 27, 32 and the shuttle chamber 28, is drawn into the piston chamber 13 and annular chamber 17 through the chamber opening 20. A check valve 33 disposed at the top of the second passageway 32, opens if the drawing pressure of the actuator piston 14 is higher than that required to displace the shuttle member 29 thus ensuring that the shuttle member 29 reaches the right-hand stop 30 before the check valve 33 opens. This check valve 33 is in communication with a reservoir portion 34 formed at the top of the housing extension 3. Hydraulic fluid which is drawn through the check valve 33 corresponds to the incremental increase in displacement of the actuator piston 14, which is a result of the wear of the brake shoe 23 as has occurred during the brake application. By utilizing the hydraulic fluid in the disk brake actuator piston chamber 13 in this manner, it can be appreciated that even minimal brake shoe 23 wear can be recognized and compensated for when returning to the brake shoe 23, disk member 25 clearance that existed before the brake application.

A bleed screw 35 extending through a reservoir lid 36, located at the top of the reservoir portion 34, allows bypassing the check valve 33 to return hydraulic fluid drawn from the reservoir portion 34 into the piston chamber 13. The bypass capability allows retraction of the brake head 22 and actuator piston 14 so that a worn brake shoe 23 could be replaced with a nonworn brake shoe 23. A third passageway 37, located below the reservoir portion 34, permits flow of the hydraulic fluid to proceed back to the reservoir portion 34 through the first then second passageways 27, 32, respectively.

In operation, the predetermined clearance between the nonworn brake shoe 23 and the disk member 25, shown in FIG. 1, should be maintained after a brake application to insure that the stroke of the hydraulic piston 6 remains uniform following each successive brake application. During the brake disengagement, as shown in FIG. 1, fluid pressure present in the hydraulic piston chamber 5, urges the hydraulic piston 6 against the disk springs 4. To effect a brake application, this fluid pressure is removed from the hydraulic piston chamber 5. The disk springs 4 then exert a force urging the hydraulic piston 5 in a rightward direction, as seen in FIG. 1. The clutch seat 7, which is secured to the hydraulic piston 6, also moves in this rightward direction until contact is made with the cone clutch 8, thus effecting a clutch engagement. The first coil spring 9, acting through the pair of thrust bearings 11, insures that the cone clutch 8 maintains the set axial position shown in FIG. 1 and that a positive clutch engagement occurs. As a result of the threaded engagement between the cone clutch 8 and the spindle member 12, the force of the disk springs 4 is then transmitted from the cone clutch 8 to the spindle member 12. The spindle member 12, which is threadably-engaged within the hollow core portion 15 of the actuator piston 14, then urges the actuator piston 14, brake head 22, and brake shoe 23 into engagement with the disk member 25, effecting a brake application. As the actuator piston 14 moves to the right, a specific amount of hydraulic fluid is drawn into the piston chamber 13 and through the first passageway 27. This drawing operation occurs as the actuator piston 14 moves to exert the braking force at which time, the flange portion 16 slides within the piston chamber 13 thus drawing the hydraulic fluid from the shuttle chamber 28, and first and second passageways 27, 32, through the annular chamber 17, chamber opening 20 and the piston chamber 13. This specific amount of hydraulic fluid drawn into the piston chamber 13 during a brake application, using a nonworn brake shoe 23, substantially corresponds to a full displacement of the shuttle member 29 from the left-hand stop 31 to the right-hand stop 30. At this point, the disk brake actuator 1 has moved far enough to the right to take up brake shoe 23 clearance and actuator deflection and is applying the full braking force. As the brake application continues, and some brake shoe 23 wear and disk member 25 wear occurs, the actuator piston 14 moves further to the right, thus drawing additional hydraulic fluid into the piston chamber 13. This additional hydraulic fluid travels through the first passageway 27, through the second passageway 32 and, being at a higher pressure level than the hydraulic fluid which displaced the shuttle member 29, opens the check valve 33 to flow out of the reservoir portion 34. The hydraulic fluid displaced during this brake application has now been separated into what can be characterized as two distinct quantities, the first being a fixed amount of hydraulic fluid corresponding to brake shoe 23 clearance and actuator deflection, and the second being a variable amount of hydraulic fluid corresponding to brake shoe 23 wear and disk member 25 wear.

Upon brake release following this brake application, the braking force is removed by fluid pressure being introduced to the hydraulic piston chamber 5 moving the hydraulic piston 6 to the left, compressing the disk spring 4. The clutch seat member 7, being secured to the hydraulic piston 6, will also move to the left. The cone clutch 8 will then return to the set axial position, as shown in FIG. 1.

Initially, the cone clutch 8, along with the spindle 12 and actuator piston 14 will follow, in an axial manner, the clutch seat 7 in the leftward direction, such following movement being due to the influence of the coil spring 9 and the return spring 26 acting through the actuator piston 14 and spindle 12. At some point determined by the amount of hydraulic fluid drawn from the reservoir portion 29 and retained in the annular chamber 17 and piston chamber 13 by the blocking action of the check valve 33, the axial following movement of the cone clutch 8, spindle 12 and actuator piston 14 arrangement will be halted. Upon brake release, initial leftward movement of the actuator piston 14, spindle 12 and cone clutch 8 arrangement forces the hydraulic fluid previously drawn into the piston chamber 13 and annular chamber 17, back through the first passageway 27, to the shuttle chamber 28 wherein the shuttle member 29 is moved from the right-hand stop 30 to the left-hand stop 31 and the second passageway 32. Once the first and second passageways 27, 32 and shuttle chamber 28 are filled, no additional hydraulic fluid can be forced out of the piston chamber 13 and annular chamber 17 thus preventing further leftward axial movement of the actuator piston 14. Such halted position of the actuator piston 14 is equivalent to the initial position of the actuator piston 14 and corresponds to the desired clearance between the brake shoe 23 and disk member 25.

Halted leftward axial movement of the actuator piston 14 does not, however, impede further rotational movement of the cone clutch 8 and spindle 12. The cone clutch 8 and spindle 12, under the influence of the coil spring 9 and with the aid of the thrust bearings 11, will rotate thus unthreading a portion of the spindle 12 from the actuator piston 14 and allowing the cone clutch 8 to assume the same position relative to the clutch seat 7 as existed prior to the brake application, brake release sequence.

In order to replace a worn brake shoe 23, it is necessary to push the actuator piston 14 further to the left than what is allowed by the shuttle member 29. This is effected by opening the bleed screw 35 situated at the top of the reservoir portion 34 and operable through an opening formed in the reservoir lid 36.

Should it be necessary to replace any hydraulic fluid to the disk brake actuator 1, a plug 38 is provided in the housing extension 3 for so doing.

Although the hereinabove-described embodiment of the invention constitutes a preferred form, modifications can be made thereto without departing from the scope of the invention as set forth in the appended claims.

Having now described the invention, what we claim as new and desire to secure by Letters Patent, is:

1. A hydraulic fluid operated disk brake actuator having a hydraulic slack-adjusting arrangement for maintaining a positive clearance between a brake shoe and a brake disk, said brake actuator comprising:
(a) an actuator housing;
(b) brake-applying means disposed in said actuator housing for exerting an axially directed braking force;
(c) hydraulic piston means disposed adjacent said brake-applying means for exerting a brake-releasing force in opposition to such braking force upon communication of such hydraulic fluid thereto and for transmitting such braking force when such hydraulic fluid is removed from communication with said hydraulic piston means;
(d) an actuator piston reciprocally movable within a piston chamber formed in said actuator housing;
(e) a rotatable threaded spindle member threadably-connected to said actuator piston;
(f) clutch means connected partially to said hydraulic piston means and partially to said spindle member for transmitting, when engaged, such braking force from said hydraulic piston means to said actuator piston;
(g) first storing means in communication with said piston chamber for storing a fixed amount of hydraulic fluid as corresponds in volumn to a displacement of a nonworn brake shoe during a brake application, said first storing means including a shuttle member movable within a shuttle chamber between a release position and an application position;
(h) second storing means in communicaticn with said first storing means and formed as a portion of said piston chamber for storing a second amount of hydraulic fluid, such second amount of hydraulic fluid being variable in volumn as a function of a volumetric wear of the brake shoe during continued brake applications;
(i) fluid supply means for providing such variable second amount of hydraulic fluid during brake application and for blocking return of such variable second amount of hydraulic fluid during brake release; and
(j) fluid-directing means for directing such first and second amounts of hydraulic fluid into said piston chamber and said second storing means during a brake application and for directing such first amount of hydraulic fluid back into said first storing means during a brake release.

2. A brake actuator, as set forth in claim 1, wherein said first storing means further includes a first passageway extending between said piston chamber and said shuttle chamber, and a second passageway extending between said shuttle chamber and said fluid supply means.

3. A brake actuator, as set forth in claim 2, wherein said second storing means further includes a graduated sleeve coaxially disposed around said piston chamber, an annular chamber coaxially surrounding at least a portion of said graduated sleeve, and at least one chamber opening formed in said graduated sleeve between said piston chamber and said annular chamber.

4. A brake actuator, as set forth in claim 3, wherein said fluid supply means includes a reservoir portion formed in said actuator housing and a one-way check valve disposed between said reservoir portion and said first storing means such that, said fluid-directing means can draw such second amount of hydraulic fluid therethrough during a brake application.

5. A brake actuator, as set forth in claim 4, wherein said fluid-directing means includes a flange portion formed on said actuator piston and a sealing element disposed in said flange portion and contacting an inner circumference of said graduated sleeve such that, movement of said actuator piston during a brake application draws such first and second amounts of hydraulic fluid into said second storing means, and movement of said actuator piston during brake release forces such first amount of hydraulic fluid back into said first storing means.

6. A brake actuator, as set forth in claim 5, wherein said first passageway is formed in an upwardly-sloping manner from said shuttle chamber to said piston chamber.

7. A brake actuator, as set forth in claim 6, wherein said reservoir portion is formed in said actuator housing above said shuttle chamber and said second passageway extends vertically between said check valve and said shuttle chamber.

8. A brake actuator, as set forth in claim 5, wherein a shoulder formed on said inner circumference of said graduated sleeve limits movement of said actuator piston by contacting said flange portion, said shoulder forming one end of said piston chamber.

9. A brake actuator, as set forth in claim 8, wherein said at least one chamber opening is formed in said graduated sleeve adjacent said shoulder.

10. A brake actuator, as set forth in claim 5, wherein said shuttle chamber and said shuttle member are disposed in a plane horizontal in relation to the longitudinal axis of said brake actuator.

11. A brake actuator, as set forth in claim 5, wherein said clutch means includes a clutch seat fixedly-secured to said hydraulic piston means and having a first clutch surface formed thereon, a clutch collar fixedly-secured to said spindle member and having a second clutch surface opposite said first clutch surface formed thereon, and a bias spring urging said clutch collar in a direction toward said clutch seat.

12. A brake actuator, as set forth in claim 11, wherein said clutch collar and said spindle move rotationally and axially simultaneous such that, a fixed distance exists between said clutch collar and said clutch seat during brake release.

13. A brake actuator, as set forth in claim 12, wherein said brake-applying means includes a plurality of disk springs.

14. A brake actuator, as set forth in claim 13, wherein said hydraulic piston means includes a hydraulic piston reciprocally movable within a hydraulic piston chamber, and further, said hydraulic piston is disposed adjacent said disk springs.

15. A brake actuator, as set forth in claim 1, wherein said second storing means includes a graduated sleeve coaxially disposed around said piston chamber, an annular chamber coaxially surrounding at least a portion of said graduated sleeve, and at least one chamber opening formed in said graduated sleeve between said piston chamber and said annular chamber.

16. A brake actuator, as set forth in claim 1, wherein said fluid supply means further includes a bleed screw selectively operable to an open position to return such second amount of hydraulic fluid to said reservoir portion.

* * * * *